US010644336B2

United States Patent
Milacic et al.

(10) Patent No.: US 10,644,336 B2
(45) Date of Patent: May 5, 2020

(54) METHODS FOR DETERMINING ANODE INTEGRITY DURING FUEL CELL VEHICLE OPERATION

(71) Applicant: Ford Global Technologies, LLC, Dearborn, MI (US)

(72) Inventors: Milos Milacic, New Boston, MI (US); Craig Winfield Peterson, West Bloomfield, MI (US); Andreas R. Schamel, Erftstadt-Kierdorf (DE)

(73) Assignee: Ford Global Technologies, LLC, Dearborn, MI (US)

( * ) Notice: Subject to any disclaimer, the term of this patent is extended or adjusted under 35 U.S.C. 154(b) by 465 days.

(21) Appl. No.: 14/568,994

(22) Filed: Dec. 12, 2014

(65) Prior Publication Data

US 2016/0172696 A1 Jun. 16, 2016

(51) Int. Cl.
*H01M 8/04992* (2016.01)
*H01M 8/04537* (2016.01)
*H01M 8/04664* (2016.01)
*H01M 8/04746* (2016.01)

(52) U.S. Cl.
CPC ... *H01M 8/04992* (2013.01); *H01M 8/04574* (2013.01); *H01M 8/04679* (2013.01); *H01M 8/04753* (2013.01); *H01M 2250/20* (2013.01); *Y02T 90/32* (2013.01)

(58) Field of Classification Search
CPC ......... H01M 8/04574; H01M 8/04679; H01M 8/04753; H01M 2250/20
See application file for complete search history.

(56) References Cited

U.S. PATENT DOCUMENTS

| 6,815,107 B2 * | 11/2004 | Inai ................... H01M 8/04089 340/659 |
| 7,942,035 B2 * | 5/2011 | Booden ............ H01M 8/04388 73/40.5 R |
| 8,524,405 B2 | 9/2013 | Salvador et al. |

(Continued)

FOREIGN PATENT DOCUMENTS

| CN | 101517801 A | 8/2009 |
| CN | 101556311 A | 10/2009 |
| CN | 101740793 A | 6/2010 |

OTHER PUBLICATIONS

Milacic, Milos, "Methods for Testing Anode Integrity During Fuel Cell Vehicle Operation," U.S. Appl. No. 14/453,583, filed Aug. 6, 2014, 43 pages.

(Continued)

*Primary Examiner* — Ula C Ruddock
*Assistant Examiner* — Thomas H. Parsons
(74) *Attorney, Agent, or Firm* — David Kelley; McCoy Russell LLP

(57) ABSTRACT

A system and methods are provided for testing anode integrity during vehicle operation. In one example described, the system and methods allow for anode leak tests during vehicle operation based on a flow of hydrogen into a fuel cell, the flow of hydrogen into the fuel cell maintaining the vehicle power while the leak test is performed. The methods further allow for operational adjustments responsive to the leak test, which may include controlling the vehicle power to manage vehicle operations in the presence of a hydrogen leak in some instances.

20 Claims, 8 Drawing Sheets

(56) References Cited

U.S. PATENT DOCUMENTS

| | | | |
|---|---|---|---|
| 2005/0008905 A1* | 1/2005 | Blum | H01M 8/04089 |
| | | | 429/423 |
| 2006/0166060 A1* | 7/2006 | Miura | H01M 8/04223 |
| | | | 429/429 |
| 2007/0207355 A1* | 9/2007 | Yoshida | H01M 8/04097 |
| | | | 429/444 |
| 2008/0141760 A1 | 6/2008 | Sienkowski et al. | |

OTHER PUBLICATIONS

National Intellectual Property Office of the People's Republic of China, Office Action and Search Report Issued in Application No. 201510919670.8, dated Jan. 19, 2020, 13 pages. (Submitted with Partial Translation).

* cited by examiner

METHODS FOR DETERMINING ANODE INTEGRITY DURING FUEL CELL VEHICLE OPERATION

FIELD

The present description relates to systems and methods for performing anode leak tests in hydrogen fuel cell vehicles.

BACKGROUND AND SUMMARY

Hydrogen leak tests may be performed in fuel cell vehicles to determine anode integrity. Hydrogen may be used as a fuel source for fuel cells joined together to form a fuel cell stack. In the fuel cell stack, hydrogen is presented on the anode side whereas air is presented on the cathode side. The fuel cell stack generates electrical current in response to the electrochemical conversion of hydrogen and oxygen into water, which may then be used to drive various devices onboard the vehicle in addition to the vehicle itself.

Current approaches to anode leak detection include performing an anode leak test (ALT) while the vehicle is operated at low fuel cell power, for example, high-density traffic or as the vehicle is idled at a stoplight. Other approaches to detecting hydrogen leaks on the anode side of the fuel cell stack may be based on dropping vehicle power without supplementing power to the vehicle in order to perform the anode leak test. However, one problem with such leak tests based on identifying periods of low power is that infrequent checks may occur dependent on the type of operation a vehicle undergoes. For example, U.S. Pat. No. 8,524,405 discloses conducting an anode leak test during a vehicle shutdown process whereas U.S. Pat. No. 7,942,035 conducts a leak test in a fuel cell vehicle only when a zero-load requirement is satisfied. An alternate approach increases the frequency of anode leak tests by providing supplemental power to the vehicle while the anode leak test occurs. However, periods still exist in the drive cycle when anode leak tests may not be performed (e.g., under high-load driving and/or low battery state-of-charge, etc.). When configured with a power source to provide supplementary power, fuel cell vehicles may include additional equipment such as an electric motor that increases a vehicle cost.

The inventors herein have recognized the above issues and disclose methods for identifying an anode leak during vehicle operation. In one described embodiment, an anode leak test is performed while the vehicle is operated with a load by comparing a current generated by the fuel cell to a current predicted for a flow of hydrogen to the fuel cell, the flow of hydrogen to the fuel cell maintaining a vehicle power during the anode leak test. When configured with this arrangement, the method further allows for reducing the vehicle power responsive to identifying the anode leak while still providing sufficient power to operate the vehicle via the hydrogen flow. As described, adjusting the vehicle power occurs responsive to the actuation of a tank valve associated with a fuel storage tank that is included to store hydrogen fuel on-board the vehicle. Closing of the tank valve may lead to a reduction of the hydrogen fuel flow that reduces the vehicle power during operation. The advantage of the method disclosed is that the anode leak test may be performed during vehicle operation, for example, as the vehicle is being operated and driven along a roadway. Another advantage of the disclosed methods is that checks for anode leaks may be performed at a higher frequency during operation for a substantially real-time determination of the degradation status of the fuel system. In this way, the technical result is achieved that conductance of the anode leak test may be extended to occur during more vehicle operating conditions for more frequent checking of anode leaks during vehicle operation, for example, while the vehicle is driven on the road.

In one example, the method may comprise a statistical comparison including a two-sample student test that accounts for an average current and envelope thereof to determine an extent of difference between the current generated by the hydrogen fuel cell and the current predicted for the flow of hydrogen into the fuel cell. The advantage of a statistical comparison based on current and/or power generated therefrom during operation is that an estimate on the size of the leak may be made based on the extent of the difference identified. Thus, in some embodiments, the method further comprises determining a size of the leak during operation responsive to identifying the anode leak while maintaining the vehicle power based on the flow of hydrogen to the fuel cell. The advantage of including such methods is the inclusion of alternate modes of vehicle operation in the presence of an anode leak. For simplicity, the system herein is described in terms of the hydrogen fuel cell, although the methods described may also be included within hybrid vehicles configured to provide supplementary power while the hydrogen fuel cell is shut off.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
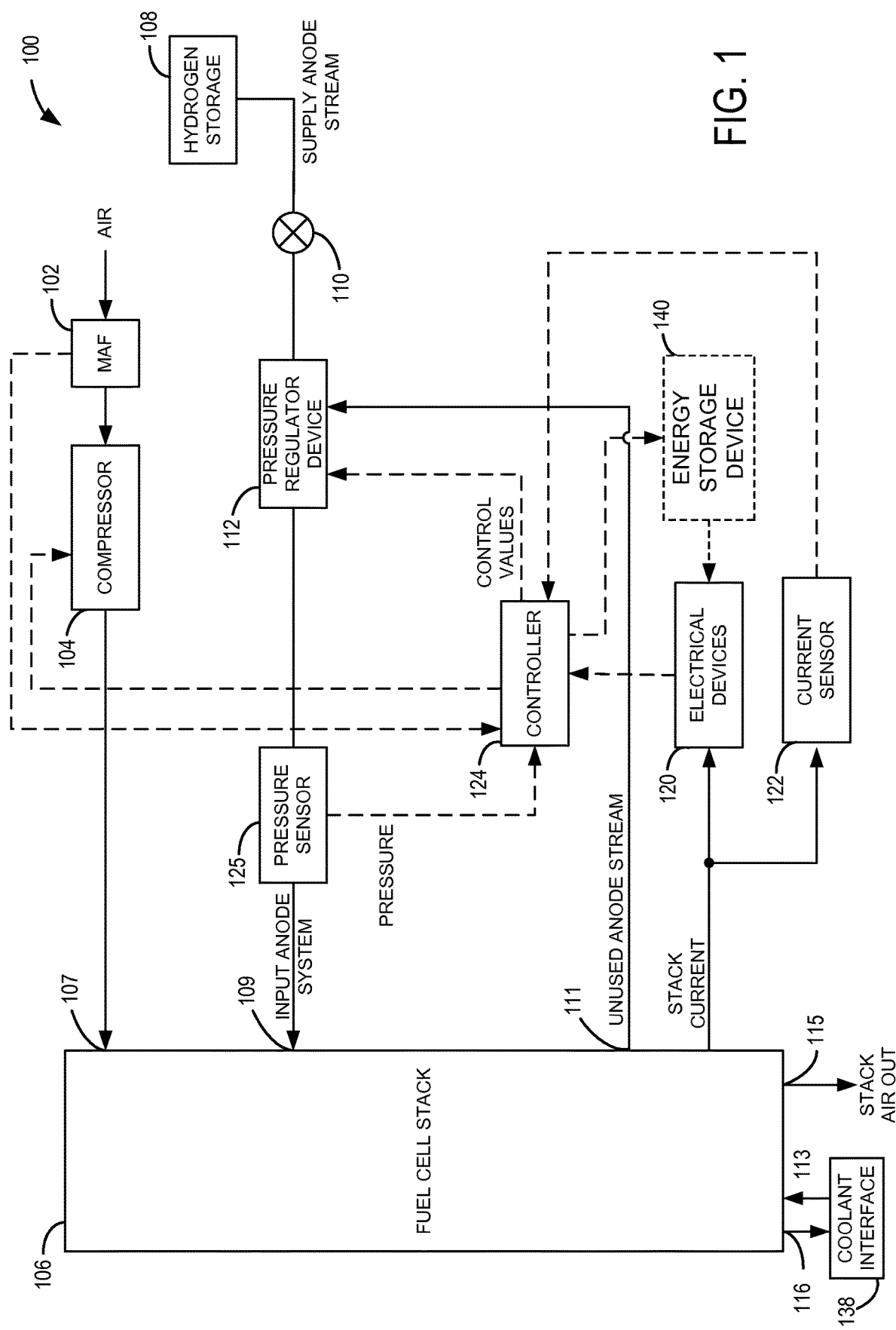
FIG. 1 illustrates an exemplary fuel cell stack system in accordance with one embodiment of the present description.
Figure 2:
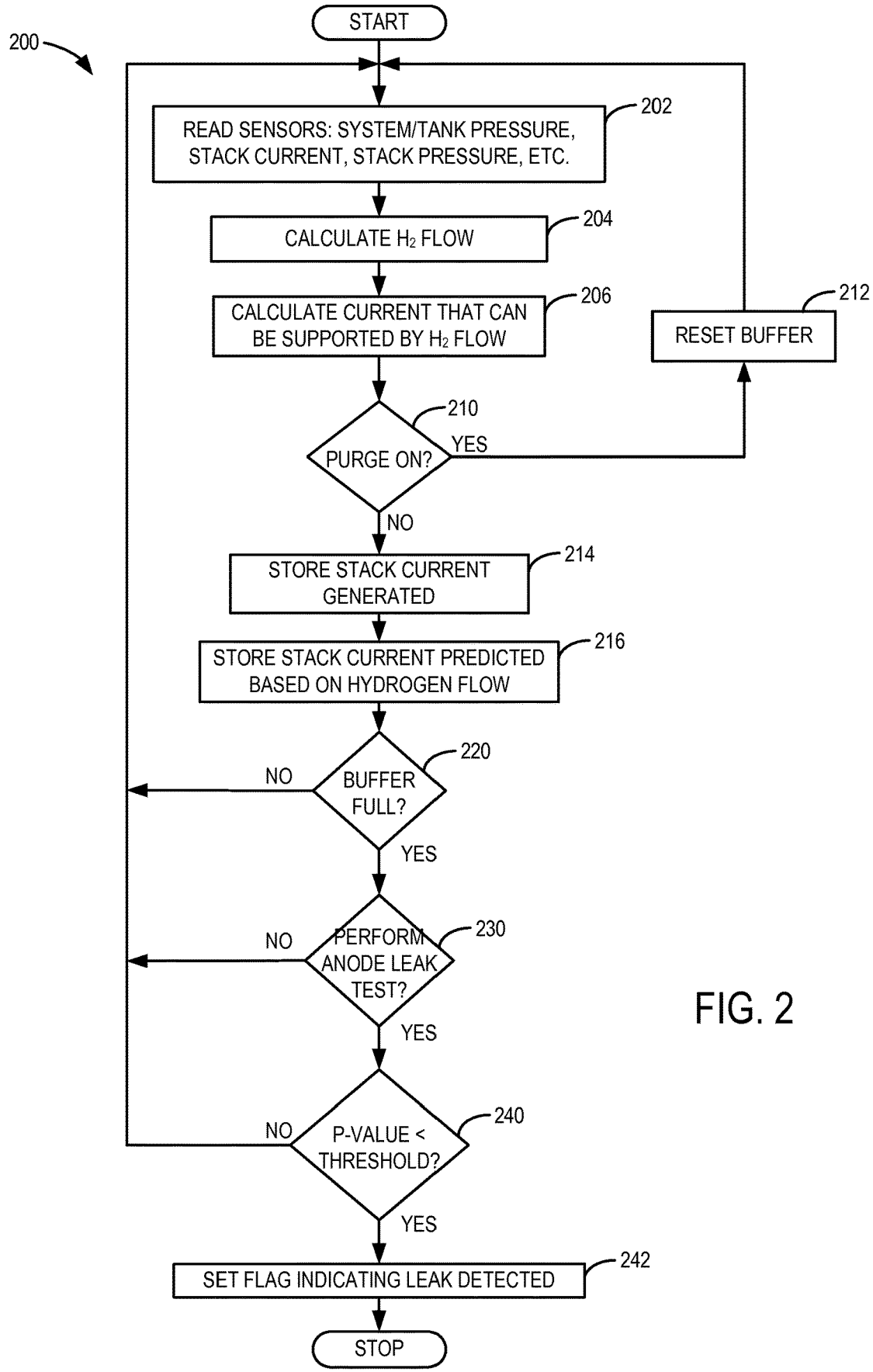
FIG. 2 shows an example flow chart illustrating a routine for identifying an anode leak during vehicle operation.
Figure 3:
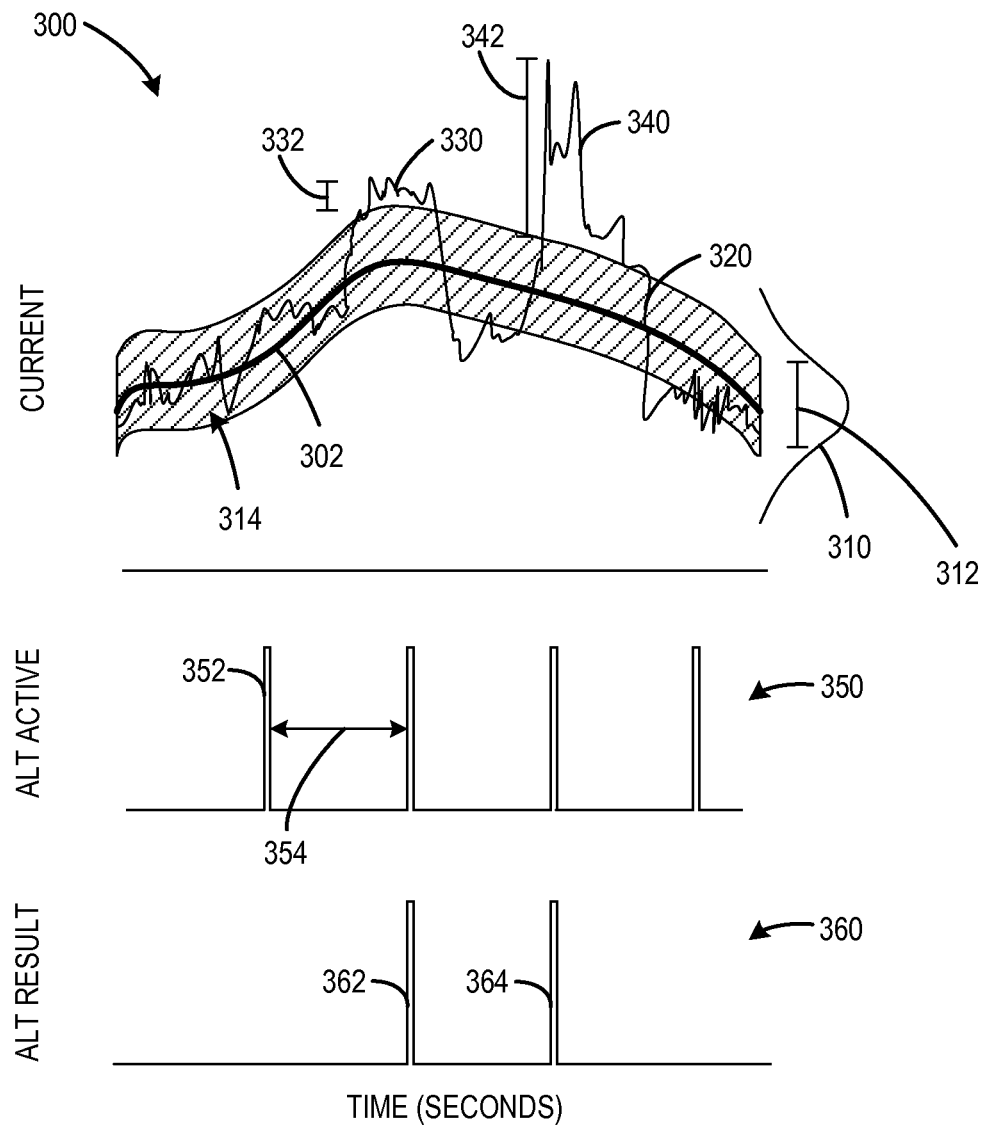
FIG. 3 schematically illustrates example data collection cycles for identifying the presence and extent of an anode leak during vehicle operation.
Figure 4:
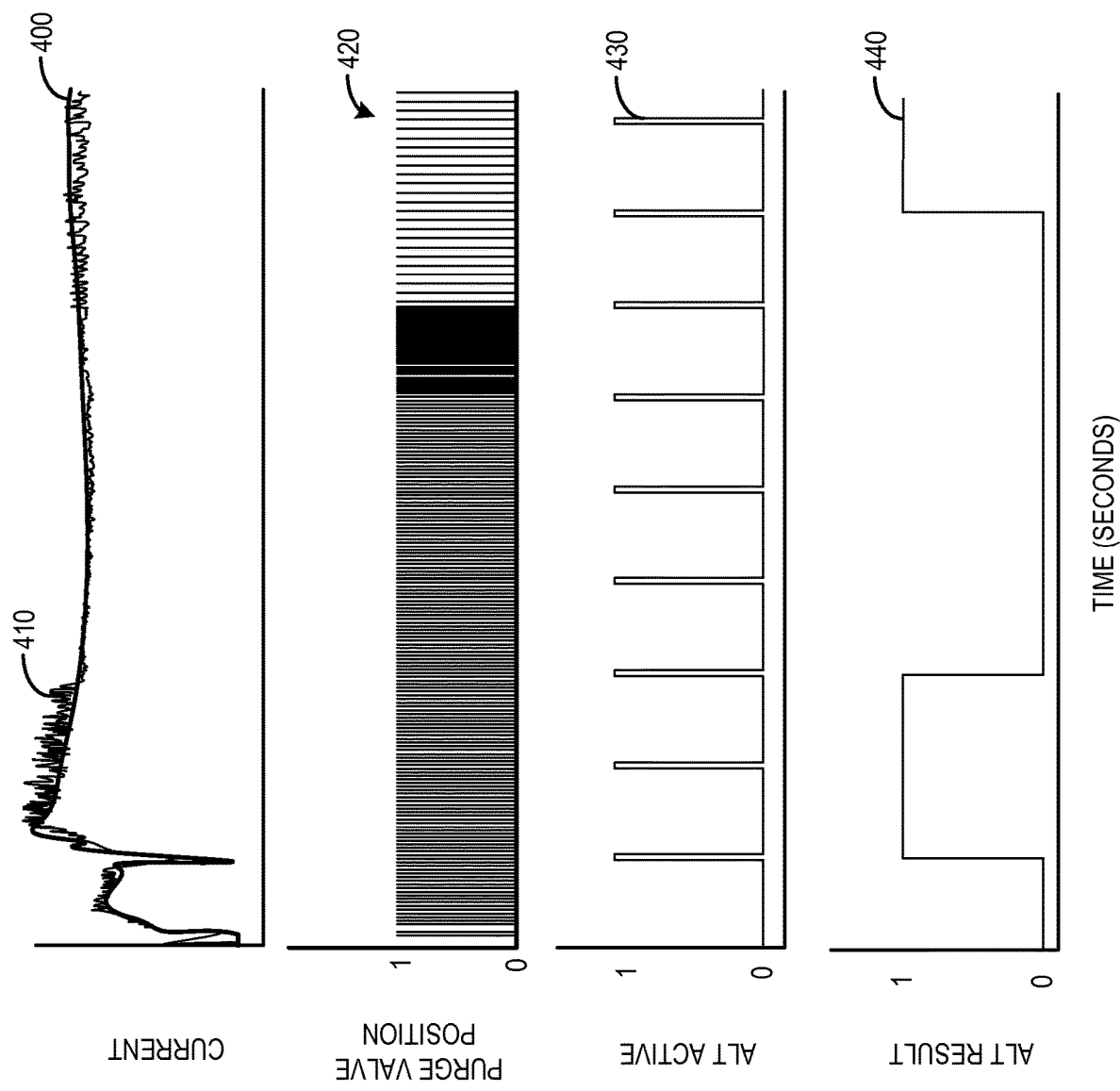
FIG. 4 schematically illustrates an example operating sequence wherein the anode leak test according to the description herein is performed during vehicle operation.
Figure 5:
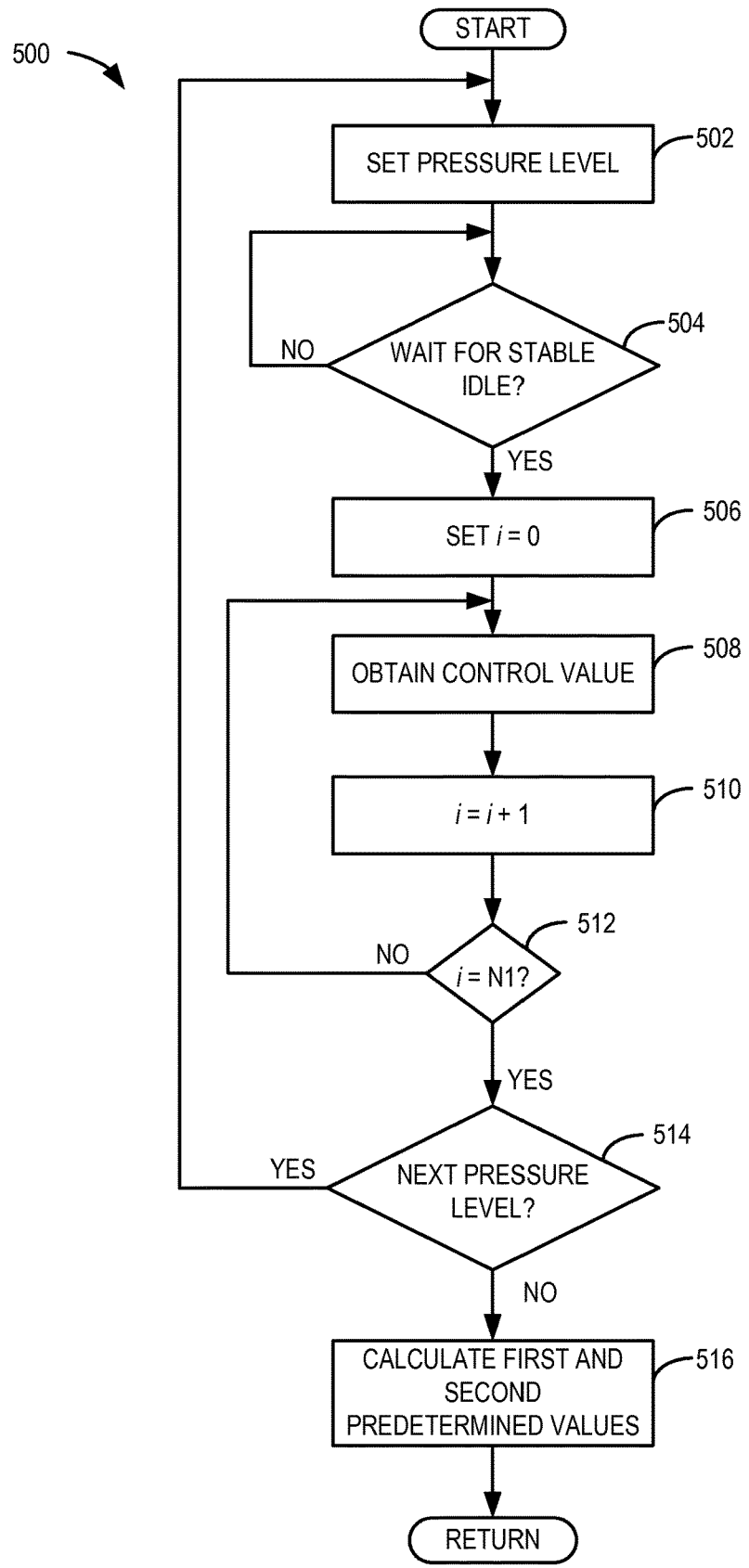
FIG. 5 illustrates a block diagram from establishing first and second predetermined pulse width modulated values as used in accordance with first and second level anode leak tests.
Figure 6:
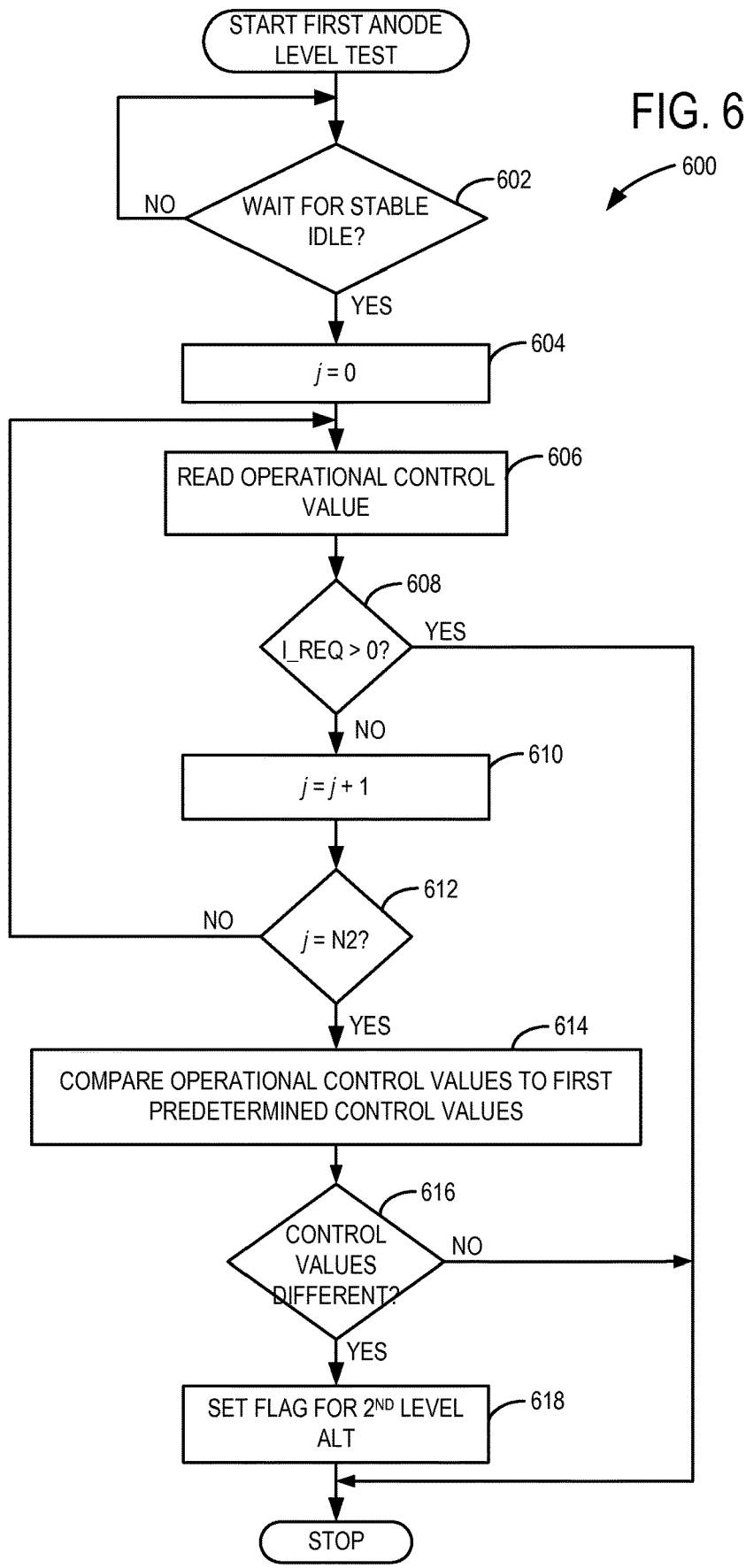
FIG. 6 illustrates a block diagram for performing a first level anode leak test.
Figure 7:
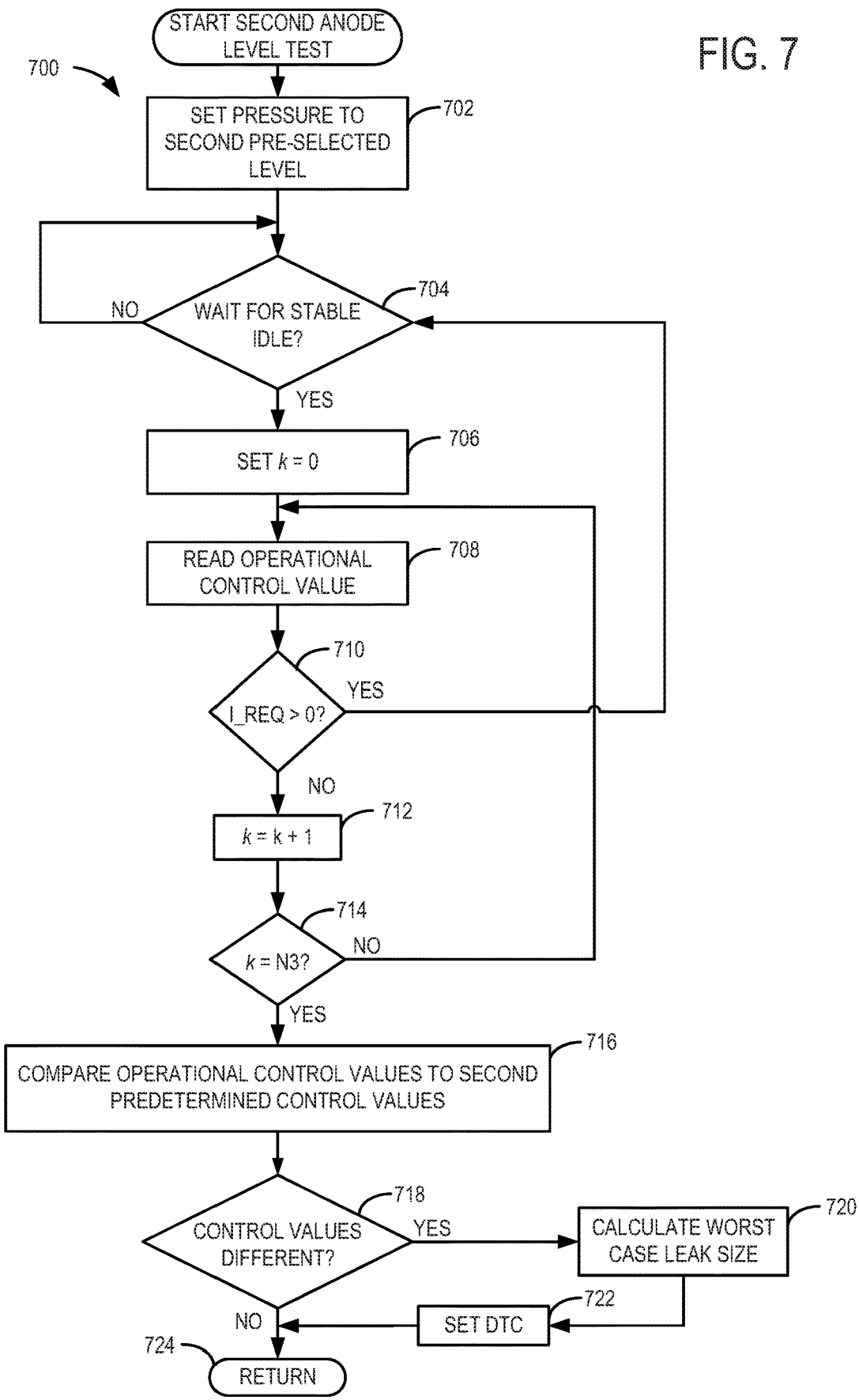
FIG. 7 illustrates a block diagram from performing a second level anode leak test.
Figure 8:
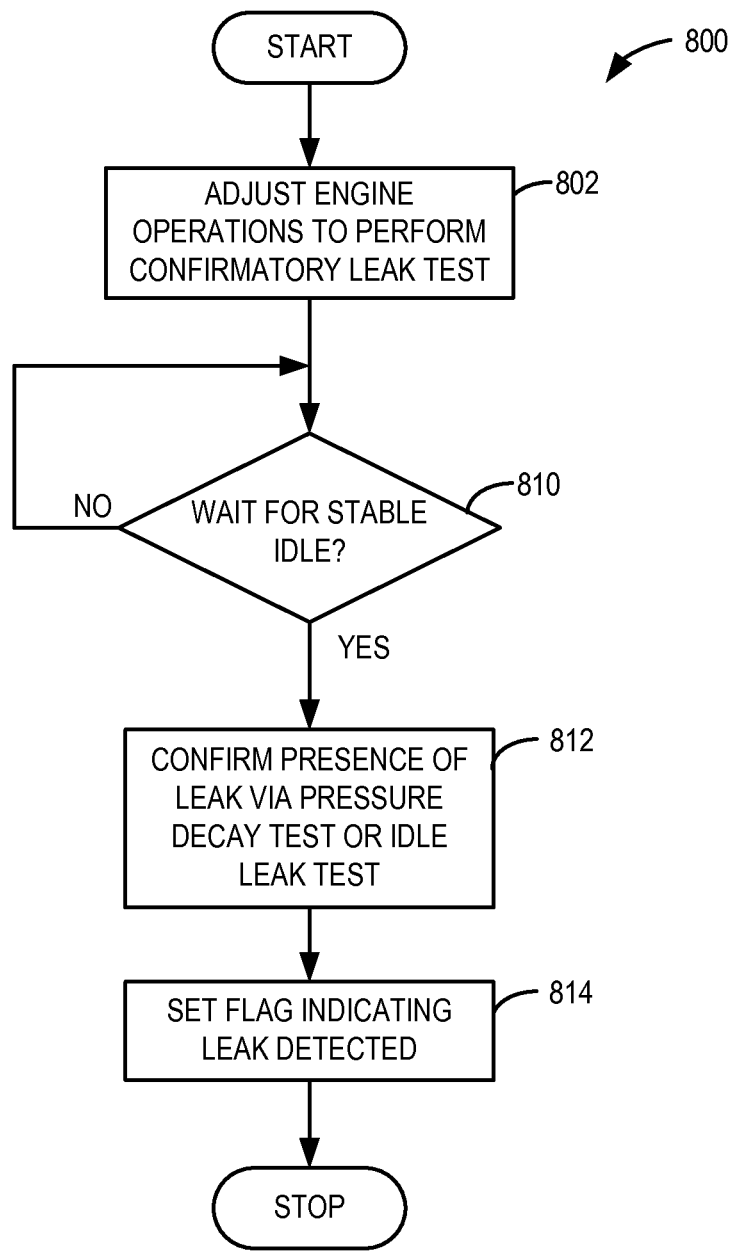
FIG. 8 provides a schematic block diagram to show one method for adjusting engine operations responsive to the anode leak test.

The following description relates to a method for detecting anode leaks in a hydrogen fuel cell system during vehicle operation. For simplicity, the methods are described in terms of a hydrogen fuel cell vehicle that may be configured to employ the methods described to identify leaks during vehicle operation and adjusting vehicle operations responsive to the leaks identified. For this reason, FIG. 1 illustrates an exemplary fuel cell stack system included within a fuel cell vehicle propulsion system. In some instances the fuel cell vehicle propulsion system may also be included within a hybrid vehicle that includes an alternate source of power such as an electric motor that provides supplementary power during vehicle operation. FIGS. 2 and 3-4 further illustrate an example routine and schematic operating sequences for performing the anode leak test during vehicle operation. The methods described include making statistical comparisons, for example, using a two-sample student t-test (sometimes referred to as the two-sample $T^2$ test, or two-sample multivariate test) based on data inputs collected during vehicle operation. Thus, FIG. 3 schematically illustrates an example data collection cycle that may be used for identifying anode leaks, whereas FIG. 4 depicts an example operating sequence that may employ the statistical comparison to show one method for identifying leaks while maintaining vehicle based on the flow of hydrogen during operation. FIGS. 5-7 are included to illustrate exemplary idle leak tests that may be performed responsive to the anode leak test described. As described herein, an idle leak test may represent a confirmatory test that is used to identify a leak responsive to the real-time anode leak test described. Because a confirmatory test based on a stable idle is included, the methods may also rely upon adjusting vehicle operations responsive to the statistical anode leak test in order to perform the confirmatory leak test. For this reason, FIG. 8 provides a schematic block diagram to illustrate one method for adjusting engine operations responsive to the anode leak test.

FIG. 1 illustrates an exemplary fuel cell recirculating system 100 in accordance with one embodiment of the present description. The system 100 may be implemented in hydrogen fuel cell vehicle, or in some embodiments may be implemented within a hybrid fuel cell based electric vehicle or any other such apparatus that uses electrical current generated by a hydrogen fuel cell to drive various devices while providing vehicle power via a flow of hydrogen from a fuel storage tank on-board the vehicle. When implemented within a hybrid vehicle, an alternative energy source may also be present that supplements vehicle power when fuel cell power is reduced or shut off during vehicle operation.

A first fluid stream (or cathode stream) which is comprised of air is fed to a mass air flow (MAF) sensor 102. The air passing through the MAF sensor 102 is atmospheric air. The MAF sensor 102 measures the amount of flow of air in the fluid stream. An air compressor 104 pressurizes the air stream and delivers the air stream to a fuel cell stack 106. The fuel cell stack 106 includes a first inlet 107 for receiving the air stream. A humidifier (not shown) may be added to the system 100 to add water vapor into the air stream. If the air includes a high water content, a humidity sensor (not shown) may be included to measure, e.g., the moisture content of the wet air. The water may be used to ensure that membranes (not shown) in the fuel cell stack 106 remain humidified to provide for optimal operation of fuel cell stack 106.

A fuel storage tank (or supply) 108 presents a supply fuel stream (or an anode stream) in the form of hydrogen. The supply anode stream comprises compressed hydrogen. While compressed hydrogen may be used in the system 100, any hydrogen fuel source may be implemented in the system 100. For example, liquid hydrogen, hydrogen stored in various chemicals such as sodium borohydride or alanates, or hydrogen stored in metal hydrides may be used instead of compressed gas.

A tank valve 110 controls the flow of the supply hydrogen. A pressure regulator device 112 regulates the flow of the supply hydrogen. The pressure regulator device 112 may include any type of device used to control the pressure or flow rate of a fluid. For example, the pressure regulator device 112 may be implemented as a pressure regulator or as a variable or multistage ejector. The pressure regulator device 112 is configured to combine the supply anode stream (e.g., hydrogen received from the tank 108) with an unused anode stream (e.g., recirculated hydrogen from the fuel cell stack 106) to generate an input anode stream (or stack hydrogen). A humidifier (not shown) may be provided to add water vapor to the input anode stream. Humidified water vapor in the input anode stream may be included to ensure that the membranes in the fuel cell stack 106 remain humidified to provide for optimal operation of the fuel cell stack 106.

The pressure regulator device 112 controls the flow of the input anode stream to the fuel cell stack 106. The fuel cell stack 106 includes a second inlet 109 that is adapted to receive the input anode stream from the pressure regulator device 112. The fuel cell stack 106 generates stack current in response to electrochemically converting the hydrogen from the input anode stream and oxygen from air in the first fluid stream.

Various electrical devices 120 are coupled to the fuel cell stack 106 to consume such power in order to operate. If the system 100 is used in connection with a vehicle, the devices 120 may include a motor or a plurality of vehicle electrical components that each consume power to function for a particular purpose. For example, such devices 120 may be associated with and not limited to a vehicle powertrain, occupant heating and cooling, interior/exterior lighting, entertainment devices, and power locking windows. The particular types of devices 120 implemented in the vehicle may vary based on vehicle content, the type of motor used, and the particular type of fuel cell stack implemented. A current sensor 122 measures the stack current generated by fuel cell stack 106. The current sensor 122 transmits measured current readings to a controller 124. The controller 124 transmits control values to the pressure regulator device 112 to control the flow of the input anode stream to the fuel cell stack 106. A pressure sensor 125 is coupled between the pressure regulator device 112 and the fuel cell stack 106 to measure the pressure of the hydrogen prior to the hydrogen being delivered to the fuel cell stack 106. The pressure sensor 125 transmits a feedback signal (e.g., PRESSURE) which is indicative of the pressure of hydrogen in the input anode stream.

Excess amounts of air and hydrogen may be delivered to the fuel cell stack 106 to increase operational robustness of the fuel cell stack 106. The fuel cell stack may discharge unused hydrogen in the unused anode stream. An outlet 111 of the fuel cell stack 106 is adapted to discharge the unused anode stream. The unused anode stream may include various impurities such as nitrogen and water both in liquid and vapor form in addition to hydrogen.

The fuel cell stack 106 includes an outlet 115 that is configured to discharge excess air. The fuel cell stack 106 includes outlet 116 that is adapted to present coolant in the form of de-ionized water ethylene glycol (DIWEG) or other suitable coolant in response to the heat generated due to the chemical processing of hydrogen and oxygen (e.g., from the air stream). A cooling interface 138 may receive the DIWEG from the fuel cell stack 106. The cooling interface 138 may also provide stack coolant to an inlet 113 of the fuel cell stack 106.

The pressure regulator device 112 is adapted to increase or decrease the pressure of the input anode stream to the stack 106 in response to control values transmitted by the controller 124. The pressure regulator device 112 is adapted to receive the supply anode stream at a constant pressure from the tank valve 110. The pressure regulator device 112 may receive the unused anode stream from the fuel cell stack 106 (or a purging arrangement not shown) at varying flow rates.

As noted above, the pressure regulator device 112 may be implemented as any pressure regulating device that is generally known in the art. Generally speaking, such pressure regulating devices adjust the pressure of a fluid in response to control values (or signals) having various electrical based characteristics. Such characteristics may include pulse width modulated (PWM) values, analog values or digital values depending on the particular type of pressure regulating device implemented. In one example, the pressure regulator device 112 may be implemented as a pulsing valve or injector that regulates the pressure of the fluid delivered to the hydrogen fuel cell. The advantage of including a pulsing injector is that the fuel flow into fuel cell stack 106 can be inferred during operation. The controller 124 may transmit control values as PWM based values for controlling the pressure regulator to increase or decrease the flow rate of input anode stream to the fuel cell stack 106. In another example, the pressure regulator device 112 may be implemented as an ejector to provide recirculation of the unused anode stream. The ejector may be implemented with a solenoid controlled needle actuator (not shown). Such a solenoid controlled needle actuator is disclosed in U.S. Pat. No. 7,943,260, entitled "System and Method for Recirculating Unused Fuel in Fuel Cell Application", to Brighton et al., which is hereby incorporated by reference in its entirety. The solenoid may move the needle in the ejector in response to the control values being analog thereby allowing for an increase or decrease of the pressure of input anode stream presented to the fuel cell stack 106. The movement of the needle is variable in nature to allow for different flow rates of the unused anode stream to be combined with the supply anode stream from the tank 108. Such a variable characteristic allows the ejector to adjust the overall flow and pressure of the input anode stream presented to the fuel cell stack 106. In yet another example, a combination of pulsing injectors to regulate the pressure of the fluid and ejectors to provide recirculation of the unused anode stream may also be included.

In some embodiments, system 100 may further include energy storage device 140 that is configured to utilize or consume a different energy source than fuel cell stack 106. For example, in some instances, energy storage device 140 may be a battery that supplements or replaces fuel cell power during vehicle operation. That is, energy storage device 140 may supplement all or a portion of fuel cell power during vehicle operation. As such, when an alternate power source is present on a vehicle with a propulsion system such as that shown in FIG. 1, the vehicle may be referred to as a hybrid fuel cell vehicle, or in some cases a hybrid electric vehicle. As another example, system 100 may be operated to drive energy storage device 140 which may in turn provide a generator function to convert the output to electrical energy, where the electrical energy may be stored in system 100 for later use. Further embodiments may include one or more rechargeable batteries, fuel cells, and/or capacitors for example. In such examples, electrical energy may be temporarily converted to chemical or potential energy for storage. The vehicle propulsion system may be configured to transition between two or more of the operating modes described herein in response to the operating conditions. Energy storage device 140 may also periodically receive electrical energy from a power source residing external to the vehicle (e.g., that is not part of the vehicle). As a non-limiting example, the propulsion system of system 100 may be configured as a plug-in hybrid vehicle in other embodiments, whereby electrical energy may be supplied to the energy storage device from a power source via an electrical energy transmission cable. Controller 124 may identify and/or control the amount of electrical energy stored at energy storage device 140, when present, which may be referred to as the state of charge (SOC). As such, it should be appreciated that any suitable approach may be used for recharging energy storage devices from a power source that does not comprise part of the vehicle (e.g., charging via a wire, wireless connection wherein the energy storage device may receive electrical energy from a power source via one or more of electromagnetic induction, radio waves, and/or electromagnetic resonance). Inclusion of an alternative source of energy via energy storage device 140 allows the vehicle propulsion by utilizing an energy source other than fuel cell stack 106. In this way, the hybrid electric vehicle, as described with reference to the propulsion system of vehicle system 100, may be configured to utilize the secondary form of energy (e.g., electrical energy) to provide power for continuous operation of the vehicle in some modes of operation.

Turning now to a description of the methods, FIGS. 2-4 are included to illustrate example routines for identifying an anode leak during vehicle operation via a leak test that is configured to compare a current generated by the fuel cell to a current predicted for a flow of hydrogen to the fuel cell, the flow of hydrogen to the fuel cell maintaining the vehicle power. For example, FIG. 2 shows an example flow chart illustrating a routine for identifying an anode leak during vehicle operation. Then, FIGS. 3 and 4 schematically illustrate exemplary data collection and operating sequences for performing the anode leak test according to the description during vehicle operation.

FIG. 2 illustrates example leak detection method 200 that is configured to identify leaks by a comparison of the current generated by the fuel cell to a current predicted for a flow of hydrogen to the fuel cell. When a vehicle is operated in the presence of a leak within fuel cell system 100, an increased flow of hydrogen may be directed into the fuel cell to maintain vehicle operations, for example, by supplying an amount of fuel to the fuel cell based on a vehicle operator demand in the presence of the leak. Said differently, the total flow of hydrogen may be increased since some of the hydrogen is reacted in the fuel stack to generate a current that provides vehicle power while the remaining portion of hydrogen is effusively leaked from fuel cell recirculation system 100, for example, into an engine compartment within the vehicle.

At 202, leak detection method 200 includes reading a sensor within the fuel cell recirculation system. For example, a system and/or tank pressure, a stack current, a stack pressure, etc. may be determined as conditions within the fuel cell recirculation system are monitored during operation. The monitoring of system parameters and/or vehicle operations may provide indicators of system viability, which may be processed by controller 124 to determine whether degradation has occurred by leak identification within the fuel cell system.

At 204, method 200 includes determining a flow of hydrogen to fuel cell stack 106. Determining the flow of hydrogen delivered to the fuel cell stack allows for a prediction of the potential current to be generated via an electrochemical conversion of hydrogen in the fuel cell stack based on the flow of hydrogen. For this reason, at 206 method 200 further includes calculating a current that can be supported based on the determined hydrogen flow. As one example, pressure sensor 125 may be coupled between pressure regulator device 112 and the fuel cell stack 106 and measure the pressure of the hydrogen prior to delivery of the hydrogen to fuel cell stack 106. Pressure sensor 125 may further transmit a feedback signal (e.g., PRESSURE) which is indicative of the pressure of hydrogen in the input anode stream to controller 124 that processes feedback received. Controller 124 may then calculate the flow of hydrogen in the input anode stream and further calculate the current supported by the flow of hydrogen into the fuel cell stack. As described in greater detail below, prediction of the current supported by the flow of hydrogen into the fuel cell stack allows for identifying an anode leak by comparing the actual current generated to the current estimated from the hydrogen flow in the input anode stream.

As described herein, controller 124 may include a data storage buffer that is configured to store input data received during vehicle operation. Inclusion of a data storage buffer allows for data input received to be stored for further computational analysis of the data by the methods described. As one example, the calculated hydrogen flow into the fuel cell stack may be stored in a data buffer that is used to calculate a running average of the calculated current that such fuel flow supports. A separate buffer may also be included that stores the actual current generated, which may also be used to calculate a running average of the generated stack current. A comparison of the two buffers then allows for the identification of leaks during vehicle operation at a desired confidence level by performing a statistical analysis, such as a two-sample t-test. In one particular example, an anode leak is identified based on the statistical comparison of the current generated and the current predicted for the flow of hydrogen to the fuel cell, the statistical comparison being a two-sample t-test.

In such an example, a two-sample t-test may be performed to compare the entire sets of predicted and generated currents to identify an anode leak. In general, the two-sample t-test may be employed to determine whether the two sets of data are equal to each other. The two-sample t-test is set forth in "STATISTICS FOR ENGINEERING AND SCIENCE" by W. Mendenhall and T. Sincich, fourth edition, p. 422-494, which is hereby incorporated by reference. In the event the generated currents are represented by the average and/or the standard deviation of the sample size (e.g., N data points received during a data collection cycle), the controller 124 may perform a one-sample t-test. The one-sample t-test is also set forth in "STATISTICS FOR ENGINEERING AND SCIENCE" by W. Mendenhall and T. Sincich as set forth above. It should be appreciated that the approach described herein does more than simply apply a known statistical test. Rather, it sets forth an approach, in combination with various hardware and software, that enables an improved technical result.

At 210, method 200 includes determining a purge state of the fuel cell recirculation system. Hydrogen is a flammable substance with an autoignition temperature that may fall within a vehicle operating temperature. Provisions may be included for maintaining the hydrogen content from becoming over-pressurized. Thus, occasional purging of the hydrogen from the fuel cell recirculation system may be included. For example, purging of hydrogen from the system may include opening a purge valve. Opening a purge valve may introduce a leak for which data collection and interpretation of another leak is difficult. In this way, removal of a portion of hydrogen from flow may not be easily quantified in the presence of the purge leak created by opening the purge valve. For this reason, when purging occurs based on an open state of the purge valve, no attempt is made to detect a possible leak in fuel cell recirculation system 100. If the purge state of fuel cell recirculation system 100 is set to "on," method 200 proceeds to box 212 where a data storage buffer is reset to begin a new data collection cycle. Thereafter, method 200 continues in the manner already described. Alternatively, if the purge state of the fuel cell system is "off," a smooth data collection cycle may be occurring, which allows for the collection of reliable data and statistical processing in the manner described below.

Continued data collection allows for additional data points to be stored in a data buffer within controller 124 that are used for identifying an anode leak during vehicle operation. At 214, method 200 includes storing the stack current generated in a data buffer and further storing the stack current predicted based on the hydrogen flow at box 216. In one implementation, method 200 may be configured to perform an anode leak test upon completion of a data set, which may be timed to occur upon reaching a full data buffer. With this arrangement, the data storage buffer advantageously acts as a timing device to allow for the periodic checking of anode integrity during operation. However, this is non-limiting and the timing of the anode leak test may alternatively be performed based on other criteria in other implementations. For example, a sudden elevation of the hydrogen flow with no increase in operator demand may signify a potential leak in the system has occurred. In this way, alternate configurations of the method may include analyzing a subset of the data stored within a data storage buffer responsive to, e.g., a spike in the hydrogen flow during operation. However, for simplicity of description, the leak test is performed once the data buffer reaches a full capacity, which in some cases may be indicated by a threshold associated with a storage capacity of the buffer. In other words, once the computational memory associated with the stored data reaches a memory threshold, the anode leak test may be performed. Alternatively, while the buffer falls below the memory threshold, method 200 may continue to accumulate more data that is used for identifying a data leak in the fuel cell recirculation system, as indicated by the no response to a full buffer at 220.

At 230, controller 124 may be configured to perform the anode leak test in response to the full buffer. If the anode leak test is to occur, method 200 proceeds by performing the comparison of the predicted current data relative to the generated current data using the statistical method such as the two-sample t-test. In some cases, additional or alternative statistical tests may be performed to identify the presence of an anode leak within the fuel cell recirculation system. If no leak test is performed, the method may continue to monitor the fuel cell system during vehicle operation. Although not shown in FIG. 2, if no leak test is performed while a data buffer is full, the buffer may be reset to allow the continued collection of input data while monitoring anode integrity on-board the fuel cell vehicle. As described herein, the statistical comparison includes performing the two-sample t-test that accounts for an average current and envelope thereof to determine an extent of difference between the generated current and the current predicted.

Because a statistical data comparison is included in example method 200, identification of an anode leak may be made based on a p-value associated with the statistical comparison. The p-value may represent the confidence level of obtaining a test result (e.g., the predicted current) based on the actual test result observed (e.g., the generated current). The confidence level may be further related to an envelope that surrounds the running average collected during the data cycle. Thus, the comparison of method 200 may further include processing a data envelope associated with one or more of the predicted and generated currents, the comparison further including a t-test that determines anode integrity based on the data envelope. For this reason, method 200 may further comprise identifying a leak based on at least a degree of difference between the predicted and generated currents and the data envelope associated therewith.

Continuing with a description of the p-value, a threshold is often used to indicate a predetermined confidence level for the data, or a confidence that the data collected is likely to be different than a reference curve. For example, the predetermined confidence level may be represented by a p-value of 0.05 or 0.01 that is used as a threshold for identifying statistical differences in the data acquired, or the presence of an anode leak. Then, if the estimated current supported exceeds the current generated, the vehicle may be consuming more fuel than is actually used to power the vehicle. When this occurs, a high likelihood may be present of a leak in the fuel recirculation system, e.g., in the anode loop of the fuel cell system. The leak may be identified by a p-value falling below the threshold that indicates the leak, as indicated at 240. Upon detecting a leak, method 200 proceeds to 242 by setting a flag that indicates the presence of a leak and communicating the message to a vehicle operator, for example, by illuminating a dashboard light that communicates the anode leak. In this way, the method further comprises communicating the anode leak to a vehicle operator during vehicle operation responsive to identifying the presence of the anode leak. However, one or more vehicle adjustments may also be made in combination with the leak communication, as described below. If no leak is detected because the determined p-value exceeds the threshold, method 200 continues by resetting the buffer to allow a new data collection cycle that determines anode integrity on-board the fuel cell vehicle.

For simplicity, FIG. 2 schematically illustrates a routine for identifying the leak via a comparison of the predicted current and the current actually generated. As described in greater detail below, one or more operational adjustments may be made responsive to the anode leak test and/or results thereof to continue vehicle operation if desired, particularly in the presence of a hydrogen leak on-board the vehicle.

Because the methods include statistical comparisons between two data sets of data in the presence of a data envelope, in another example method, the processing may further include estimating an extent of the anode leak based on the distance that a data point falls outside of the data envelope. In this way, the current predicted exceeds the current generated when a leak is present, the extent of the current predicted relative to the current generated being further used to determine the size of the leak. For example, a relatively high predicted current that falls outside of the data envelope of the generated current, e.g., as determined using the variance or noise in the data of the generated current for a data collection cycle, may indicate that a larger leak is present in the fuel cell system whereas a relatively small predicted current that falls outside of the data envelope of the generated current by a small amount may indicate a smaller leak is present. Thus, a relative gradient may also exist based on the statistical comparison that can be advantageously used to enable operational adjustments, such as a limp-home mode of operation in the presence of a leak. Alternatively, a small leak may allow for temporary vehicle operation based on an operator demand with no reduction in power in some instances. FIG. 3 schematically illustrates an example vehicle operating sequence to illustrate the collection of data for identifying the presence of an anode leak during vehicle operation. For simplicity, the schematic data shown are enlarged to illustrate the comparisons in greater detail.

Temporal current plot 300 is shown in the top figure and includes an example plot of the current data (e.g., predicted and generated currents) that is used to power a vehicle during operation. ALT activity 350 is illustrated in the middle figure and shows active periods when anode leak tests are performed. Then, in the bottom figure, ALT results 360 are shown that are used to indicate the status of anode leaks within the system. Such results may be used to identify anode leaks according to the methods herein described that further allow for operational adjustments based on the anode leaks during vehicle operation. Time increases from left to right.

Current plot 300 depicts an average generated current 302 that may represent, for example, the stack current generated in response to electrochemically converting the hydrogen from the input anode stream and oxygen from air in the first fluid stream during vehicle operation. For simplicity, the noise of average generated current 302 is shown as the generated current envelope 310, which may be defined by a spread or variance 312 within the measured data. Based on the average input data and data envelope thereof, generated current window 314 is shown to illustrate a window associated with the average buffer data that provides a means for identifying anode leaks based on the comparisons to a predicted current 320 (shown without a data envelope for simplicity). When predicted current 320 exceeds and falls outside of the generated current window 314 during a data collection cycle, a potential leak may exist within the system. The plot shown includes two such regions to illustrate how the predicted current exceeds the generated current when an anode leak is present.

The plot of ALT activity 350 shows regions where the buffer has reached a storage capacity and thus has triggered the statistical comparisons (e.g., two-sample t-test) that are used to identify the anode leaks. A first example active ALT 352 is identified. After the test has been performed, data collection cycle 354 may begin to collect a new set of data and keep a running average of the current data during collection. Upon reaching a memory storage capacity another anode leak test may be triggered, which is illustrated by a second active ALT. Thereafter, the process may continue in the same manner.

Returning to the example comparisons shown within current plot 300, small leak 330 is illustrated by a portion of the predicted current that falls just outside of the generated current window 314, but is detectable by a statistical comparison such as the two-sample t-test described herein. As indicated above, the methods described may identify the extent of the leak as a small leak based on the close distance 332 between the two curves within the region of the data collection cycle for which data was used to perform the test. According to the methods described, such a comparison may trigger first ALT leak 362 shown within ALT results 360.

Likewise, relatively large leak 340 is illustrated by a portion of the predicted current that falls a greater distance outside of the generated current window 314 compared to small leak 330. As indicated above, the methods described may identify the extent of the leak as a large leak based on the large distance 342 between the two curves. Such methods may trigger second ALT leak 364 shown.

FIG. 4 schematically illustrates an example operating sequence wherein the anode leak test is performed during vehicle operation. Therein, the generated current 400 is shown in the top plot along with the predicted current 410. For simplicity, the schematic data are shown without data envelopes for clarity of presentation. However, the statistical methods herein may still account for the data envelopes of the current curves when identifying anode leaks within the fuel cell system. The second plot from the top illustrates purge valve position 420, which may represent the open/close state of a purge valve during vehicle operation. Although the on/off state of the purge valve is intermittently adjusted for system purging during the data collection cycles shown in FIG. 4, in some instances, the buffer of controller 124 may still collect data even though system purging has occurred. When arranged in this manner, the data used for identifying the presence of a leak may comprise the contiguous data elements located proximal to one another, but residing on different sides of the purge valve adjustment. In this way, the methods may advantageously allow for uninterrupted data collection cycles for high frequency leak detection in some instances, even in the presence of purging.

The third plot illustrates ALT activity 430 that includes regions where the anode leak test is actively performed to identify an anode leak whereas the fourth plot shows ALT result 440 that graphically depicts the outcome of the anode leak tests performed. In FIG. 4, the state of the ALT result is shown in the on state (e.g., 1) or off state (e.g., 0). For example, in some instances, the state of the system may be maintained throughout the next data collection cycle as illustrated. In other instances, the ALT result may be indicative of the measured p-value. In FIG. 4, regions wherein an ALT flag has been set to 1 indicate excessive fuel usage that may further indicate anode leaks and system degradation. Although example engine adjustments are not illustrated in FIG. 4, in some instances, one or more operational adjustments may be made responsive to the identification of an anode leak.

As one example, FIGS. 5-7 illustrate exemplary engine adjustments performed responsive to an identified leak. Upon detecting a leak, vehicle adjustments may be made to confirm the presence of the leak. As one example, the confirmatory test may be a pressure decay test wherein the system is pressurized and further monitored to detect pressure changes therein. For example, WO 2008071402 titled "LEAKAGE TEST IN A FUEL CELL SYSTEM," herein incorporated by reference, may be included as an example leak detection method. A drop in pressure may indicate the leak in the fuel cell recirculation system. As another example, an idle leak test may be performed wherein operational adjustments are made for a stable load on the fuel cell stack. For example, U.S. Pat. No. 7,942,035 titled "ANODE LEAK TEST IMPLEMENTATION," herein incorporated by reference, may be included as one example of the leak detection method performed to determine anode integrity. As described there, and reproduced herein, system 100 utilizes a series of anode leak tests that are generally performed when the load on the fuel cell stack 106 is stable. In some instances, the methods may include an alternative energy source to supplement fuel cell power while the confirmatory test is performed so to allow for the confirmatory tests to be performed during vehicle operations. However, in other instances, operational adjustments may be made to perform the confirmatory leak test at low fuel cell idle loads, for example.

Operational adjustments performed responsive to the anode leak test may be implemented according to a functional safety features protocol. For example, the additional tests and vehicle adjustments thereof may be implemented following the Functional Safety Standard ISO 26262, which may be used to guide the automotive product development phase. The standard ISO 26262 guidelines may range from the specification, to design, implementation, integration, verification, validation, and production release. The standard ISO 26262 is an adaptation of the Functional Safety standard IEC 61508 for Automotive Electric/Electronic Systems, and defines functional safety for automotive equipment applicable throughout the lifecycle of all automotive electronic and electrical safety-related systems.

Upon reaching a stable load, a first level anode leak test may be performed. In a first level anode leak test, the controller 124 determines whether the fuel cell stack 106 has been reduced below a requested power that in one example is a fuel cell idle state based on the amount of current generated by the fuel cell stack 106. In response to determining that the fuel cell stack 106 is in the idle state, controller 124 controls the pressure regulator device 112 to control the pressure of the input anode stream at a first pre-selected pressure level in response to various control values. As noted above, such control value or values may be PWM-based, analog, or digital. The pressure sensor 125 transmits the actual pressure amount on the signal PRESSURE back to the controller 124 to determine if the actual pressure amount is equivalent to the first pre-selected pressure level. The controller 124 measures and records the values associated with driving the pressure regulator device 112 to determine if such values are equal to predetermined control value(s). In the event the control values are not equal to first predetermined control values the controller 124 may run a second level anode test in response to the fuel cell stack 106 being in an idle state. The second level anode test may be similar to the first level anode test with the exception of the use of a second pre-selected pressure level being utilized instead of the first pre-selected pressure level. In addition, second predetermined value(s) are established to correspond to the second pre-selected pressure level. The second pre-selected pressure level may correspond to a higher pressure level than that of the first pre-selected pressure level. Exemplary first and second level anode leak test are shown in more detail in FIGS. 6 and 7. Prior to performing the first and second level anode leak tests, the system 100 is calibrated to define the predetermined control ranges for the first and second pre-selected pressure levels, respectively. Such a calibration may be performed at an end-of-line (EOL) test while the vehicle is being produced or manufactured.

FIG. 5 illustrates a block diagram 500 for establishing first and second predetermined control value(s) as used in accordance with the first and second level anode leak tests, respectively.

In block 502, the pressure regulator device 112 is controlled (via the controller 124 with the control values) to distribute hydrogen (e.g., in the input anode stream) to the first pre-selected pressure level. The first pre-selected pressure level generally corresponds to a low pressure level. The first pre-selected pressure level may correspond to the pressure difference between the anode and cathode.

In block 504, the current sensor 122 measures the amount of current generated by the fuel cell stack 106 to determine if the stack current is equal to a predetermined amount of current which generally corresponds to the fuel cell stack 106 being in an idle state. In one example, a stack current of 3 A may correspond to the fuel cell stack 106 being in the idle state. The particular amount of stack current used to indicate whether the fuel cell stack 106 is in the idle state may vary based on the type of fuel cell stack implemented, various vehicle loads, and other system-to-system variations. If the measured stack current is not equal to the predetermined amount of current, then the diagram 500 remains in the block 504 until the predetermined amount of current is achieved. If the measured stack current is equal to the predetermined amount of current, then the diagram 500 moves to block 506.

In block 506, a counter variable (e.g., i) is initialized.

In block 508, the controller 124 obtains the corresponding control value that is being used to drive the pressure regulator device 112 in order to achieve the first pre-selected pressure level attained in block 502. The controller 124 stores the control value in volatile memory.

In block 510, the counter variable i is incremented in response to storing the control value.

In block 512, the diagram 500 determines whether the counter value i is equal to a predetermined sample size (e.g., N1). Generally speaking, the system 100 experiences noise which may cause a number of control values to be measured while the first pre-selected pressure level is attained. Due to such a condition, N1 is selected to achieve a sample size that ensures a high degree of confidence. In one example, N1 may correspond to a sample size of 120 measurements of control values that are used to achieve the first pre-selected pressure level. The sample size may vary based on the desired criteria of a particular implementation. If i is equal to N1, then the diagram 500 moves to block 514. If i is not equal to N1, then the diagram 500 moves back to block 508 to obtain additional measurements.

In block 514, a determination is made whether to control the pressure regulator device 112 via the controller 124 with another set of control values to distribute hydrogen in the input anode stream at the second pre-selected pressure level. The second pre-selected pressure level is set to a pressure that is greater than the first pre-selected pressure level. If the second pre-selected pressure level has not been established, the diagram 500 moves back to block 502. If the second pre-selected pressure level has been established, the method 500 moves to block 516.

In block 516, the controller 124 determines the first predetermined values and stores the first predetermined values in non-volatile memory (e.g., EEPROM). In one example, the first predetermined values may correspond to a range of measured control values to achieve the first pre-selected pressure level. Such a range may include the sample size N1. As noted above, in one example, the sample size may include 120 control value measurements. In such a case, a range of 120 control values may be stored in non-volatile memory. In yet another example, the controller 124 may calculate an average and standard deviation of the measurements which comprise the sample size N1. In such an example, the average and/or the standard deviation may be defined as first predetermined value(s).

Block 502 is re-executed to establish the second pre-selected pressure level. In block 502, the pressure regulator device 112 is controlled (via the controller 124 with control values) to distribute hydrogen at the second pre-selected pressure level.

Block 504 is re-executed to determine if the stack current is equal to a predetermined amount of current which generally corresponds to the fuel cell stack 106 being in an idle state. If the measured stack current is not equal to the predetermined amount of current, then the diagram 500 remains in the block 504 until the predetermined amount of current is achieved. If the measured stack current is equal to the predetermined amount of current, then the diagram 500 moves to block 506.

Block 506 is re-executed to re-initialize i.

Block 508 is re-executed so that the controller 124 obtains the corresponding control value that is being used to drive the pressure regulator device 112 to achieve the second pre-selected pressure level attained in the re-executed block 502. The controller 124 stores the corresponding control value in volatile memory.

Block 510 is re-executed to increase i in response to storing the control value.

Block 512 is re-executed to determine whether the counter value i is equal to N1. As noted above, the system 100 experiences noise which may necessitate for a number of control values to be measured while the second pre-selected pressure level is attained. Due to such a condition, N1 is selected to achieve a sample size that is sufficient to establish a high degree of confidence. If i is not equal to N1, then the diagram 500 moves back to block 508 to obtain additional measurements.

Block 514 is re-executed to determine if the second pre-selected pressure level control value has been established. The diagram moves to block 516.

In block 516, the controller 124 determines the second predetermined values and stores the second predetermined values in non-volatile memory. In one example, the second predetermined control values may correspond to a range of measured control values to achieve the second pre-selected pressure level. Such a range may include the sample size N1. As noted above, in one example, the sample size may include 120 control value measurements. In such a case, a range of 120 control values may be stored in non-volatile memory. In yet another example, the controller 124 may calculate an average and standard deviation of the measurements which comprise the sample size N1. In such a case, the average and/or the standard deviation may be defined as first predetermined value(s).

FIG. 6 illustrates a block diagram 600 for performing the first level anode leak test. In block 602, the current sensor 122 measures the amount of current generated by the fuel cell stack 106 to determine if the stack current is equal to the predetermined amount of current. Such a condition is indicative of whether the fuel cell stack 106 has been reduced to the idle or stable state. If the measured stack current is not equal to the predetermined amount of current, then the first anode leak test may not be performed. If the measured stack current is equal to the predetermined amount of current, then the diagram 600 moves to block 604.

In block 604, a counter variable (e.g., j) is initialized.

In block 606, the controller 124 reads and stores a particular operational control value that is being used to drive the pressure regulator device 112 to adjust the pressure of the input anode stream to reach the first pre-selected pressure level.

In block 608, the controller 124 determines whether the fuel cell stack 106 is coming out of the idle state. For example, the controller 124 may assess the current readings being transmitted by the current sensor or read message activity on a multiplexed bus protocol (e.g., a control area network (CAN)) to determine what the driver is demanding (e.g., throttle position, brake position, etc.). In the event the fuel cell stack 106 comes out of the idle state, the diagram 600 ceases to perform the first anode level test and suspends performance of the test.

In block 610 j is incremented.

In block 612, the diagram 600 determines whether the counter variable j is equal to a predetermined sample size (e.g., N2). As noted above, it may be necessary for the controller 124 to obtain multiple readings of the control values based on the desired confidence level in view of noise considerations. If the counter variable j is equal to N2, then the diagram 600 moves to block 614. If the counter variable j is not equal to N2, then the diagram 600 moves back to block 606. In general, it may take seconds for blocks 606, 608, 610 and 612 to be executed (e.g., 5 seconds may correspond to the amount of time needed to obtain the PWM value measurements). The particular amount of time to execute blocks 606, 608, 610 and 612 may vary depending on controller design, software and the desired amount of test confidence.

In block 614, the controller 124 compares the operational control values that were stored or measured from block 606 to the first predetermined control values as established in the diagram 500. For example, the controller 124 may compare the operational control values of block 606 to the first predetermined control values (e.g., the entire set of 120 measurements of the first predetermined control values as obtained in block 516). In such an example, a two sample t test may be performed to compare the entire set of operational control values of block 606 to the entire set of the first predetermined control values. As described above, a sample t test may be employed to determine whether the two sets of data are equal to each other.

In block 616, the controller 124 determines whether the stored operational control values of block 606 are equal to the first predetermined control values. If the stored operational control values of block 616 are not equal to the second predetermined control values, the diagram 600 moves to block 618. If the stored operational control values of block 606 are equal to the first predetermined control values, the diagram 600 moves to block 602. It is appreciated that the controller 124 employs a number of statistically based methods to determine if the values are equal or not equal to each other. For example, the values may be statistically equal to each other to be deemed equal. Likewise, in the event the values are not within some pre-defined statistical range, the values may not be considered equal.

In block 618, the controller 124 sets a flag to indicate that the second anode leak test is to be performed.

In general, if the stored operational control values of block 606 are different from the first predetermined control values, such a condition may be indicative of an anode leak in the system 100. For example, a leak may be inferred since the controller 124 may have to drive the pressure regulator device 112 at operational control values that are different than the control values used to establish the first predetermined control values in order to achieve the first pre-selected pressure level. The operational control values needed to maintain the pressure of the hydrogen at the first pre-selected pressure level becomes distinguishable as an error state or indicator in the event such control values are not equal to the first predetermined control values.

FIG. 7 illustrates a block diagram 700 for performing the second level anode leak test. The second level anode leak test is generally performed when the controller 124 sets the flag indicating that the operational control values do not fall within the first predetermined value range as noted in diagram 600.

In block 702, the controller 124 controls the pressure regulator device 112 to adjust the pressure of the hydrogen in the input anode stream to the second pre-selected pressure level.

In block 704, the current sensor 122 measures the amount of current generated by the fuel cell stack 106 to determine if the stack current has been reduced to the predetermined amount of current. If the measured stack current has not been reduced to the predetermined amount of current, then the diagram 700 waits for the fuel cell stack 106 to enter into the idle state. If the measured stack current has been reduced to the predetermined amount of current, then the diagram 700 moves to block 706.

In block 706, a counter variable (e.g., k) is initialized.

In block 708, the controller 124 reads and stores the particular operational control value that is being used to drive the pressure regulator device 112 to adjust the pressure of the input anode stream to reach the second pre-selected pressure level.

In block 710, the controller 124 determines whether the fuel cell stack 106 is coming out of the idle state. In the event the fuel cell stack 106 comes out of the idle state, the diagram 700 moves to the block 704. In the event the fuel cell stack 106 remains in the idle state, the diagram 700 moves to block 712.

In block 712, the counter variable k is incremented.

In block 714, the diagram 700 determines whether the counter variable k is equal to a predetermined sample size (e.g., N3). If k is equal to N3, then the diagram 700 moves to block 716. If k is not equal to N3, then the diagram 700 moves back to block 708.

In block 716, the controller 124 compares the operational control values that were stored or measured in block 708 to the second predetermined control values as established in the diagram 500. The controller 124 compares the operational control values of block 708 to the second predetermined control values in a similar manner as disclosed in block 614.

In block 718, the controller 124 determines whether the stored operational control values of block 718 are equal to the second predetermined control values. If the stored operational control values of block 708 are not equal to the second predetermined control values, the diagram 700 moves to block 720. If the stored operational control values of block 708 are equal to the second predetermined control values, the diagram 700 moves to block 724. As noted above, the controller 124 may employ any number of statistically based methods to determine if the values are equal or not equal to each other. For example, the values may be statistically equal to each other to be deemed equal. Likewise, in the event the values are not within some pre-defined statistical range, the values may not be considered equal.

In block 720, the controller 124 calculates the worst case leak size. For example, the controller 124 may calculate the worst case leak size based on f (PRESSURE, control input, and operating system parameters), function f depends on system and controller design. In one example, function f may be described as:

$$\text{Leak Size} = \frac{-a + bP_{H_2Supply} + c(\mu)}{P_{anode} - P_{out}} \quad (1)$$

where $P_{out}$ denotes the pressure at the exit of the leak (cathode or ambient), $p_{H_2supply}$ denotes the incoming pressure, and $P_{anode}$ denotes the pressure on the signal PRESSURE, u corresponds to the one or more of the operational control values acquired in block 708, and parameter a, b, and c are variables which depend on system architecture and/or other such design criteria associated with the fuel cell stack 106. μ is a control included to maintain a pressure, for example, as described in M. Milacic, V. Booden, J. Grimes, and Bernd Maier, "Hydrogen leak detection method derived using DCOV methodology." SAE International Journal of Materials and Manufacturing, pgs. 97-102. SAE, 2008, incorporated in its entirety herein by reference. The diagram 600 contemplates that the block 720 may also be performed in place of block 618 in the event the diagram 700 is not implemented.

In block 722, the controller 124 sets a diagnostic trouble code which may be retrieved by a service tool.

In block 724, the diagram 700 exits out of the second anode leak test.

The first and/or second anode leak tests may be applied to a fuel cell apparatus that is generally situated to generate power in response to electrochemically converting hydrogen from the anode side and oxygen from the cathode side. The system 100 generally contemplates that the first anode leak test may be performed to detect the presence of an anode leak without performing the second anode leak test to confirm the anode leak test performed during vehicle operation. The second anode leak test may also be performed at the second pre-selected pressure level that is higher than the first pre-selected test (e.g., at a high resolution) to confirm the findings of the first anode leak test and the anode leak test performed during vehicle operation, as described in greater detail above. In some embodiments, an alternate source of power may be included to power the vehicle using a supplementary power source like a motor while the confirmatory tests are performed.

In this way, the methods further comprise reducing the vehicle power responsive to identifying the anode leak while providing sufficient power to operate the vehicle. Thus, the methods may further rely upon adjusting vehicle operations responsive to the anode leak test performed during vehicle operation. Adjustment of engine operations responsive to the leak test herein described may advantageously allow for the confirmatory leak test to be more reliably performed. For this reason, FIG. 8 provides a schematic block diagram that illustrates method 800 for adjusting engine operations responsive to the anode leak test.

Although FIG. 8 is described with respect to an idle leak test, in some instances, the methods may be implemented based on a confirmatory test that is a pressure decay test. Thus, operational adjustments made responsive to the leak test are possible that place the vehicle in the appropriate operating conditions for performing the pressure decay test. As one example, supplementary power may be provided on-board a hybrid vehicle while a pressure decay test is performed. In the pressure decay test, the system is pressurized and further monitored to detect pressure changes after the pressurization. A drop in pressure after the pressurization may then be used to identify and confirm the leak in the fuel cell recirculation system. In this way, the confirmatory leak test may be one or more of an idle leak test and a pressure decay test.

At 802, method 800 includes adjusting engine operations to perform the confirmatory leak test. For example, after a leak has been identified during operation using the statistical methods, e.g., method 200, controller 124 may reduce the power to the vehicle to a stable idle prior to performing the confirmatory test. Reducing the vehicle power may include actuating 110 tank valve to reduce the flow of hydrogen to fuel cell 106, the reduced flow of hydrogen providing the reduced vehicle power that operates the vehicle in some instances. As noted above, in some instances, supplementary power may be provided to meet an operator demand while the idle leak test is performed. In block 810, the current sensor 122 measures the amount of current generated by the fuel cell stack 106 to determine if the stack current has been reduced to the predetermined amount of current. If the measured stack current has not been reduced to the predetermined amount of current, then the method 800 waits for the fuel cell stack 106 to enter into the idle state. If the measured stack current has been reduced to the predetermined amount of current, then the method 800 moves to block 812.

At 812, controller 124 makes adjustments to perform the confirmatory test to confirm the presence of the leak. Herein, the confirmatory test is an idle leak tests (e.g., FIGS. 5-7), however, the leak may also be confirmed by performing a pressure decay test instead. At 814, a flag or indicator may be set that indicates a leak has been detected. For example, controller 124 may determine the extent of the leak to determine the anode integrity and further communicate the leak to a vehicle operator. In some instances, communicating the leak to the vehicle operator may include illuminating a light on a dashboard responsive to the confirmatory test indicating the presence of the leak. Thereafter, additional adjustments may be included based on, e.g., ISO 26262 for operating the vehicle in the presence of a hydrogen leak. As one example, method 800 may comprise closing the tank valve to shut-off the flow of hydrogen to the fuel cell responsive to the leak.

The approach just described sets forth an approach, in combination with various hardware and software, that enables an improved technical result for a hydrogen fuel cell vehicle. The approach is described in terms of the methods, comprising identifying an anode leak during vehicle operation based on a comparison of a current generated by the fuel cell to a current predicted for a flow of hydrogen delivered to the fuel cell, the flow of hydrogen delivered to the fuel cell maintaining vehicle operation in the presence of the leak; estimating a size of the leak and setting a flag that communicates the leak to a vehicle operator; and adjusting the flow of hydrogen responsive to the leak to adjust a vehicle power. The methods further comprise reducing the flow of hydrogen to the fuel cell responsive to the leak and performing a confirmatory leak test responsive to the reduced flow of hydrogen, the confirmatory leak test including one or more of an idle leak test and a pressure decay test. Because maintaining vehicle operation is desirable to a vehicle operator, the methods may also include switching vehicle power to an alternate power source in some implementations to power the vehicle while the flow of hydrogen to the fuel cell is reduced, for example, while the confirmatory test is performed. Then, when a hydrogen leak is identified onboard the vehicle, the methods further allow for shutting off the flow of hydrogen to the fuel cell for increased safety. Shutting off the flow of hydrogen may occur responsive to the anode leak and/or confirmatory leak test indicating the presence of the leak (e.g., by closing a tank valve).

The methods described advantageously allow methods for determining anode integrity in hydrogen fuel cells during vehicle operation. As described the methods include performing a leak test configured to compare a predicted current based on a flow of hydrogen to the fuel cell to a current generated by the fuel cell, the flow of hydrogen to the fuel cell providing power to the vehicle during the leak test. Performing the anode leak test during vehicle operation includes, for example, performing the leak test when the vehicle is driven down the highway under a substantially high engine load. Another advantage of the methods disclosed is that checks for anode leaks may be performed at a higher frequency since such checks occur during vehicle operation. In this way, the methods allow for a substantially real-time determination of the degradation status of the fuel system, which offers the attractive potential for making adjustments based on the anode leak test during vehicle operation. The ability to conduct anode leak tests during vehicle operation further extends system status checks to more, and in one example nearly all, vehicle operating conditions that enables the more frequent checking of anode leaks over the operating life of the vehicle operation.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
identifying an anode leak during vehicle operation while a fuel cell is not under stable load via a leak test that compares a current generated by the fuel cell to a current predicted for a flow of hydrogen to the fuel cell, the current generated by the fuel cell maintaining a vehicle power, including,
calculating the current predicted based on electrochemical conversion of the flow of hydrogen to the fuel cell,
storing current predicted data and current generated data over time in a data buffer, the current predicted including a running average current predicted calculated from the stored current predicted data corresponding only to when a hydrogen purge valve is closed and the current generated including a running average current generated calculated from the stored current generated data corresponding only to when the hydrogen purge valve is closed, and
identifying the anode leak based on the current generated deviating from the current predicted.

2. The method of claim 1, further comprising reducing the vehicle power responsive to identifying the anode leak while providing sufficient power to operate a vehicle.

3. The method of claim 2, wherein reducing the vehicle power includes actuating a tank valve to reduce the flow of hydrogen to the fuel cell, the reduced flow of hydrogen providing the reduced vehicle power that operates the vehicle.

4. The method of claim 1, further comprising identifying the anode leak based on a statistical comparison of the current generated and the current predicted for the flow of hydrogen to the fuel cell, the statistical comparison being a two-sample t-test.

5. The method of claim 4, wherein the current predicted exceeds the current generated when a leak is present, an extent of the current predicted relative to the current generated being further used to determine a size of the leak.

6. The method of claim 5, wherein the flow of hydrogen to the fuel cell is adjusted while providing power to a vehicle, the flow of hydrogen being adjusted to supply sufficient fuel for powering the vehicle in the presence of the leak.

7. The method of claim 6, further comprising closing a tank valve to shut-off the flow of hydrogen to the fuel cell responsive to the leak.

8. The method of claim 7, wherein operational adjustments are made to power the vehicle using an alternate power source responsive to the flow of hydrogen to the fuel cell.

9. The method of claim 1, wherein identifying the anode leak based on the current generated deviating from the current predicted includes identifying the anode leak based on the current generated deviating from the current predicted in response to an amount of storage capacity consumed by current data stored in the data buffer increasing above a threshold storage capacity.

10. The method of claim 1, wherein storing current predicted data and current generated data over time in the data buffer includes storing the current predicted data and the current generated data over time in the data buffer when the hydrogen purge valve is open and when the hydrogen purge valve is closed.

11. A method for a hydrogen fuel cell, comprising:
determining anode integrity during vehicle operation while the fuel cell is under variable load via a leak test configured to compare a predicted current based on a flow of hydrogen to the fuel cell to a current generated by the fuel cell, wherein the predicted current includes a running average predicted current calculated from predicted current data stored over time in a data buffer corresponding only to when hydrogen purging from the fuel cell is stopped, and wherein the current generated includes a running average current generated calculated from current generated data stored over time in the data buffer corresponding only to when hydrogen purging from the fuel cell is stopped, the flow of hydrogen to the fuel cell providing power to a vehicle during the leak test, wherein a leak is identified in response to the generated current deviating from the predicted current by more than a threshold amount, and the predicted current is calculated based on electrochemical conversion of the flow of hydrogen to the fuel cell.

12. The method of claim 11, wherein the comparison includes processing a data envelope associated with one or more of the predicted and generated currents, the comparison further including a two-sample t-test that determines anode integrity based on the data envelope.

13. The method of claim 12, further comprising estimating an extent of the leak based on a degree of difference between the predicted and generated currents and the data envelope associated therewith.

14. The method of claim 13, further comprising adjusting the flow of hydrogen to the fuel cell responsive to the leak, and performing a confirmatory leak test.

15. The method of claim 14, wherein the confirmatory leak test is one or more of an idle leak test and a pressure decay test.

16. The method of claim 15, wherein the extent of the leak determines the anode integrity, the anode integrity being further communicated to a vehicle operator.

17. A method for a hydrogen fuel cell vehicle, comprising:
identifying an anode leak during vehicle operation while a fuel cell is operated under variable load based on a comparison of a current generated by the fuel cell to a current predicted for a flow of hydrogen delivered to the fuel cell, the current predicted including a running average current predicted calculated from current predicted data stored over time in a data buffer corresponding only to when purging of hydrogen from the fuel cell is stopped, the current generated including a running average current generated calculated from current generated data stored over time in the data buffer corresponding only to when purging of hydrogen from the fuel cell is stopped, the flow of hydrogen delivered to the fuel cell maintaining vehicle operation in a presence of the leak, wherein the current predicted is calculated based on electrochemical conversion of the flow of hydrogen delivered to the fuel cell, and the leak is identified in response to the current generated deviating from the current predicted by more than a threshold amount;
estimating a size of the leak and setting a flag that communicates the leak to a vehicle operator; and
adjusting the flow of hydrogen responsive to the leak to adjust a vehicle power.

18. The method of claim 17, further comprising reducing the flow of hydrogen to the fuel cell responsive to the leak and performing a confirmatory leak test responsive to the reduced flow of hydrogen, the confirmatory leak test comprising a pressure decay test.

19. The method of claim 18, further including switching the vehicle power to an alternate power source to power the vehicle while the flow of hydrogen to the fuel cell is reduced.

20. The method of claim 18, further comprising shutting off the flow of hydrogen to the fuel cell responsive to the confirmatory leak test indicating the presence of the leak.

* * * * *